(12) United States Patent
Rueck et al.

(10) Patent No.: US 11,983,970 B2
(45) Date of Patent: May 14, 2024

(54) SENSOR APPARATUS AND METHOD FOR MONITORING THE DRIVING-MODE-DEPENDENT STATE OF A VEHICLE

(71) Applicant: carValoo GmbH, Essen (DE)

(72) Inventors: Steffen Rueck, Kernen im Remstal (DE); Felix Boemer, Essen (DE); Nico Schoen, Essen (DE); Sophie Ruoshan Wei, Munich (DE); Frederik Noll, Essen (DE)

(73) Assignee: carValoo GmbH, Essen (DE)

( * ) Notice: Subject to any disclaimer, the term of this patent is extended or adjusted under 35 U.S.C. 154(b) by 711 days.

(21) Appl. No.: 17/255,613

(22) PCT Filed: Jun. 26, 2019

(86) PCT No.: PCT/EP2019/067063
§ 371 (c)(1),
(2) Date: Dec. 23, 2020

(87) PCT Pub. No.: WO2020/007688
PCT Pub. Date: Jan. 9, 2020

(65) Prior Publication Data
US 2021/0264693 A1     Aug. 26, 2021

(30) Foreign Application Priority Data
Jul. 4, 2018   (DE) .................... 10 2018 211 047.6

(51) Int. Cl.
*G07C 5/00*      (2006.01)
*G01C 19/00*    (2013.01)
(Continued)

(52) U.S. Cl.
CPC ............. *G07C 5/008* (2013.01); *G01C 19/00* (2013.01); *G01P 15/18* (2013.01); *G01S 19/01* (2013.01); *G07C 5/04* (2013.01); *G07C 5/085* (2013.01)

(58) Field of Classification Search
CPC .......... G07C 5/008; G07C 5/04; G07C 5/085; G01C 19/00; G01P 15/18; G01S 19/01
(Continued)

(56) References Cited

U.S. PATENT DOCUMENTS

| 6,748,305 | B1 | 6/2004 | Klausner |
| 2003/0216889 | A1 | 11/2003 | Marko |

(Continued)

FOREIGN PATENT DOCUMENTS

| CN | 107042824 A | 8/2017 |
| CN | 108137056 A | 6/2018 |

(Continued)

OTHER PUBLICATIONS

English Translation of International Search Report issued in PCT/EP2019/067063, dated Sep. 24, 2019.
(Continued)

*Primary Examiner* — Maceeh Anwari

(57) ABSTRACT

A vehicle-mounted sensor apparatus for determining the state of at least one mechanical vehicle component is described that has at least one sensor element capturing a mechanical variable, wherein sensor data captured by the at least one sensor element are continuously capturable in any operating state of the vehicle, a communication element by means of which captured sensor data are transmittable to an external computer for further processing, and a computing unit for reducing the volume of data of the sensor data to be transmitted to the external computer.

12 Claims, 4 Drawing Sheets

(51) Int. Cl.
*G01P 15/18* (2013.01)
*G01S 19/01* (2010.01)
*G07C 5/04* (2006.01)
*G07C 5/08* (2006.01)

(58) Field of Classification Search
USPC .................................................... 701/31.4
See application file for complete search history.

(56) References Cited

U.S. PATENT DOCUMENTS

| | | | |
|---|---|---|---|
| 2016/0112216 A1* | 4/2016 | Sargent | G07C 5/008 370/328 |
| 2017/0053460 A1 | 2/2017 | Hauser et al. | |
| 2017/0069144 A1 | 3/2017 | Lawrie-Fussey | |
| 2017/0113664 A1 | 4/2017 | Nix | |
| 2017/0243412 A1 | 8/2017 | Deville | |
| 2020/0295549 A1 | 9/2020 | Kurata | |

FOREIGN PATENT DOCUMENTS

| | | |
|---|---|---|
| DE | 100 14 994 A | 10/2000 |
| DE | 103 19 493 A | 11/2003 |
| DE | 11 2006 002 329 T | 7/2008 |
| DE | 20 2013 007 358 U | 11/2014 |
| DE | 10 2013 218 813 A | 3/2015 |
| DE | 10 2015 008 725 A | 3/2016 |
| DE | 10 2015 212 525 A | 1/2017 |
| EP | 3 021 290 A | 5/2016 |

OTHER PUBLICATIONS

Prüfungsbescheid [Examination Notice] dated May 11, 2023 From the European Patent Office Re. Application No. 19735257.8. (4 Pages).

* cited by examiner

SENSOR APPARATUS AND METHOD FOR MONITORING THE DRIVING-MODE-DEPENDENT STATE OF A VEHICLE

CROSS REFERENCE TO RELATED APPLICATIONS

This application is a U.S. National Stage Entry of International Patent Application Serial Number PCT/EP2019/067063, filed Jun. 26, 2019, which claims priority to German Patent Application No. DE 10 2018 211 047.6, filed Jul. 4, 2018, the entire contents of both of which are incorporated herein by reference.

FIELD

The present disclosure generally relates to a sensor apparatus as well as a method for monitoring the driving-mode-dependent state of a vehicle.

BACKGROUND

Today, there is little to no transparency about the individual usage history of vehicles. Therefore, the resulting vehicle state and the degree of wear, particularly of chassis and body components, cannot be determined automatically on a regular, for example, daily basis since the underlying usage history regarding mechanical stress, shocks or other events or incidents due to the individual driving behaviour or the road conditions is not known.

Furthermore, car manufacturers have very heterogeneous and proprietary sensor systems on board that give the vehicle owner or operator very limited access to use such sensor data for their own vehicle or fleet diagnostic purposes. Therefore, there is an increasing demand in the industry for easily retrofittable and vehicle-independent sensor systems for the continuous monitoring and analysis of vehicle data, with particular regard to the detection and quantification of mechanical stress, such as impacts or other cases of damage for example, as well as cases of abuse due to individual driving behaviour of the respective driver, the road conditions present in driving mode or external influences of third parties during standstill or when the vehicle is parked.

DE 10 2009 025 278 A1 provides a method and a device for the evaluation of vehicle wear and tear for the billing of motor vehicles allocated for use. Thereby, the method uses the device to determine key indicators that essentially represent wear-causing forces and forces acting on the wheels. The device can be operated independently of the vehicle and exclusively with in-house equipment. While driving the vehicle, the device registers the path traveled and forces that are wear-related and act on the wheels. On the basis of this information, a key indicator representing the current driving style is determined, by means of which, for the respective affected vehicle, successive rental processes of the vehicle can be optimized in such a way that the renter achieves an average calculated rental price. The device can display the key indicator, for example, graphically to the driver via a display unit. This key indicator represents the current wear situation of the vehicle. By integrating the key indicator over time or the path, the wear situation of the vehicle can be determined for a duration and/or route. This allows an evaluation of vehicle wear and tear for the billing of motor vehicles allocated for use.

Thus, a need exists for a sensor apparatus with at least one sensor element capturing at least one mechanical variable and with a communication element, wherein sensor data captured by the at least one sensor element are reliably recorded both during the running of a vehicle as well as during a vehicle shutdown or in the rest/parking state of the vehicle, and wherein the recorded sensor data are transferred or transmitted to an external computer or to an external computer system, e.g., to a cloud computing system or to a cloud computing system, for further processing or analysis of the sensor data. Because of the complexity of the sensor data and, in particular, in view of the resulting volume of data, an incoming data evaluation is only possible with a relatively high level of computing power or capacity. In order to reduce or minimize the volume of data to be currently transferred from the sensor apparatus or the vehicle to the external computer, the sensor apparatus has a computing unit, e.g., a microprocessor or a microcontroller, by means of which the raw sensor data provided by the sensor element are pre-processed in such a way that not all raw data must to be transmitted to the external computer.

DETAILED DESCRIPTION

Figure 1:
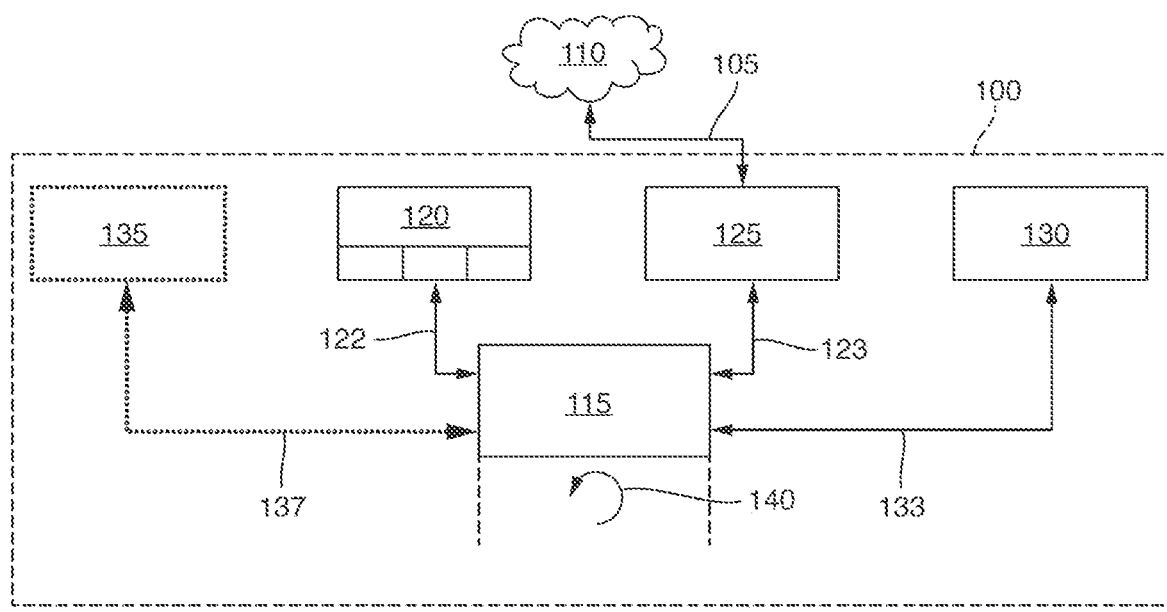
FIG. 1 is a schematic view of functional components of an exemplary embodiment of the sensor apparatus, as well as a radio-technical connection of the sensor apparatus to a computer network connected by means of cloud computing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a sensor apparatus as well as a method for monitoring the driving-mode-dependent state of a vehicle, in particular, of chassis/body components of a vehicle.

It must be noted that it can also be provided that the microcontroller only transmits events to the external computer that have been detected and have already been classified.

It should also be emphasized that the invention allows for a continuous monitoring of the vehicle, i.e., both in driving mode as well as during standstill of the vehicle. By means of monitoring of the vehicle, it is also possible to reliably detect and characterize any external impacts, events or influences on the vehicle in order to be able to detect, for example, a vehicle misuse or improper use of the vehicle, for example, in the form of very slight to severe impacts or impact events. Accordingly, the invention also makes reliable accident detection of the vehicle possible.

The sensor element can be an acceleration sensor and/or a gyroscope sensor and/or a noise-sensing acoustic sensor. Preferably, known three-axis acceleration and/or angle sensors can be used.

The sensor apparatus can comprise a sensor for the positioning or locating of the vehicle, e.g., a GPS or GNSS receiver, by means of which position data of the vehicle provided by a "Global Positioning System" (GPS) or "Global Navigation Satellite System" (GNSS) can be received. This allows the recorded sensor data to be assigned to this position data in order to be able to coordinate or correlate the sensor data, for example, with road information, traffic information, etc.

The communication element makes a wireless communication of the sensor apparatus with the external computer possible, for example, as a mobile network module via a wireless connection over a mobile network. By means of this, the recorded sensor data can be transmitted temporarily, regularly or continuously to the external computer regardless of the vehicle position.

By transmitting the sensor data to an external computer, the captured sensor data cannot only be comprehensively evaluated with a high level of computing power, but also the results of the evaluation can be made available to third parties, for example, an owner, user, renter or insurance provider of the vehicle. The sensor data captured or transmitted by the sensor apparatus make possible an essentially complete picture or a complete history of the interaction of the respective driver with the vehicle or of events acting on the vehicle from the outside.

These events affecting the vehicle can correspond to normal vehicle use or be identified as anomalies which do not correspond to the intended or proper use of the vehicle. Such events are to be considered to be anomalies, meaning events to be assessed critically for the vehicle state that can lead to premature wear of one or a plurality of vehicle components, for example, chassis components such as shock absorbers or springs. Thereby, such critical events can also be detected, which do not lead to an immediate impairment of function or externally visible damage images but to a premature wear and tear of one or a plurality of vehicle components.

The sensor apparatus is preferably designed as a sensor box independent of the respective vehicle electronics, for example, a sensor box that can be attached or fastened to an undercarriage, chassis or body component of the vehicle.

Therefore, the sensor apparatus does not have to resort to on-board communication systems but generates the driving data via its own sensor system. Therefore, the sensor apparatus is largely independent of its actual installation position or location in the respective vehicle, since the apparatus, based on its own initialization algorithm and an empirically specifiable start-up pattern, can independently determine or find its position or spatial orientation in the vehicle or the position or orientation of an existing vehicle coordinate system.

In the method that is also proposed, the raw sensor data are read out and cached continuously or on a regular basis. The raw data captured within an empirically specifiable time window are pre-processed, wherein it is checked whether a threshold value, which is also empirically specifiable, is exceeded, thereby indicating that a possible event influencing the determination of the state of the vehicle component is present. The threshold value can be determined on the basis of an empirical data model that can be parameterized separately, wherein the data model can be based on physical variables or other vehicle parameters.

If the threshold value is not exceeded, a sleep mode is activated, and the method is executed again. If a possible event is detected, a sleep mode, if applicable, is deactivated and it is checked to see if there is a relevant event. If this is the case, then the cached raw data of the affected time window are called up and transmitted to an external computer. If no relevant event is detected, so-called null data are generated for the affected time window, thereby being transmitted to the external computer. This null data can be transmitted, for example, by providing the short piece of information, "No event", together with a timestamp corresponding to the respective time window. Null data generated in this way are characterized, in particular, by a relatively small data size or volume of data compared to the originally captured sensor data.

In the proposed method, it can furthermore be provided that sensor data read out during an active sleep mode are initially cached in a buffer memory and that the sensor data stored in the buffer memory are used if the specified threshold value is not exceeded in order to restore a previous time interval with respect to a relevant event.

The proposed method thereby represents an ongoing closed process, which ensures that the raw data supplied at least by the sensor system are captured at every stage of operation of the vehicle, i.e., in particular, also in a resting phase of the vehicle, thereby being transmitted to the external computer. This makes it possible to have the vehicle history affected here fully available for evaluation on the external computer.

The proposed method thus makes it possible that the in-depth and thus computationally intensive data analysis does not already have to be carried out in the sensor apparatus but can be carried out on a specified external computer. In the sensor apparatus, only a pre-processing of the captured sensor data is carried out in order to filter out irrelevant or redundant data components for the subsequent externally performed data analysis, thereby minimizing the data traffic over the mobile network that is mostly present. In order to detect also possible deterioration or damage caused during the standstill of the vehicle, the method is carried out constantly or continuously, i.e., also during standstill or parking phases of the vehicle, and not only during the operation or driving operation of the vehicle.

The raw sensor data can be encrypted by the sensor apparatus before the said caching within the sensor apparatus or at least before it is sent to the external computer in order to ensure sufficient data security for the possibly personal usage data of the vehicle.

The advantages of the proposed sensor apparatus and the proposed method could be that an accurate and prompt capturing, processing and analysis of the detected sensor data is made possible. This allows a complete usage or mechanical stress history to be created for a particular vehicle, which can include a wide variety of events in the product life cycle. Such events can comprise, in terms of their importance to the value of the vehicle, the mechanical state of certain vehicle components actually localized, and the traceability and severity of mechanical damage to the vehicle caused by vehicle abuse or accidents.

Eligible vehicle components can be an undercarriage or undercarriage component, a chassis or body component, a vehicle outer skin component or vehicle tires.

The generation or creation of a complete digital vehicle history also enables the owner of a vehicle to track every kilometer driven in the vehicle's history with regard to the events experienced, e.g., damage, driving styles and/or each road surface driven over. For these events, the corresponding position data can be evaluated and thus, a possible correlation with on-site conditions, e.g., road conditions, can be carried out subsequently. On the basis of the resulting information, a relative vehicle wear can be determined.

In the case of vehicle fleets, this information may be statistically evaluated, for example, relative to a representative vehicle type or group of users. As a result, relative vehicle wear can also be related to a statistical comparison group of a vehicle fleet. This enables user-group-specific evaluations, as well as evaluations of relative residual value losses of the vehicles under consideration due to the different vehicle wear determined.

A further advantage of the proposed sensor apparatus and the proposed method could be that even relatively minor or slight vehicle damage, which is not visually recognizable but can lead to premature wear or failure of components, could be detected. This also allows vehicle abuse to be transparently qualified and quantified for a car rental company, a leasing company or an insurance company for example, even before the vehicle is inspected. Other benefits could result, for example, due to an improved assistance to vehicle drivers in the event of damage, more detailed information on the cause of an accident and the cause, or improved preparation of damage reports based on sensor information, and more targeted indications of components likely to be repaired.

The invention may be used in particular in a land vehicle, for example, a passenger vehicle or a commercial vehicle, but also in watercraft, underwater vehicles, aircraft or the like, which are subject to a usage-dependent mechanical wear of the mechanical vehicle components concerned here. For example, aircraft landing gears present in aircraft can be monitored in a similar way with regard to their mechanical state caused by flight operations, in particular, take-offs and landings.

It is also possible to use rail-bound vehicles in order to check or monitor the mechanical wear of bogies, particularly those present there.

Furthermore, the invention can be applied accordingly in industrial areas, for example, in the conveyor technology used in ore mining, for monitoring the mechanical state of transport rollers used there. Thereby, it should be emphasized that the roller monitoring is very time-consuming and therefore costly due to the conveyor belts, which often extend over many kilometers.

Finally, the invention can also be used in transport lifts, escalators and passenger bridges accordingly in order to be able to continuously or constantly monitor the mechanical stress or the corresponding wear of hard-to-reach hoisting winches and ropes or of also difficult to access transport rollers used in escalators for example.

The computer program is set up to perform every step of the method, particularly if it runs on a computing device or control device. It allows the implementation of the method in a specified sensor apparatus without having to make structural changes to it. For this purpose, the machine-readable data carrier is provided, on which the computer program is stored. By installing the computer program onto a microprocessor or microcontroller of such a sensor apparatus, a sensor apparatus is obtained that is set up to perform the method.

Further advantages and embodiments of the invention arise from the description and the enclosed drawings.

The sensor apparatus shown schematically in FIG. 1, bounded by a line 100, has a sensor module 120, which, in the present exemplary embodiment, has a 3-axis acceleration sensor and a 3-axis gyroscope. These two sensors continuously collect vehicle motion data with a specifiable defined sampling rate of up to 200 Hz.

Such relatively high-frequency sampling rates in the said range make it possible to obtain a sufficiently high temporal resolution within a defined or empirically specifiable time window in the case of relatively brief events in order to enable a sufficiently accurate event logging and evaluation. The acceleration data captured by the acceleration sensor can also be limited to values or amplitudes of max. +/−30 g.

Additional sensors, e.g., acoustic or vibration sensors (piezo sensors) and/or temperature sensors, can also be provided. The sensor module 120 can additionally have a standard GPS or GNSS receiver in order to be able to additionally record the current vehicle position.

The raw data provided by the sensor module 120 via a first data line 122 are pre-processed in the sensor apparatus 100 by means of a microcontroller 115 in order to reduce or minimize the volume of data to be transmitted to the external computer 110, in the present case, a cloud platform or cloud provider or an Internet of Things (IoT) platform, via a wireless data connection 105. The pre-processed or correspondingly compressed or reduced data are then cached in this exemplary embodiment in a data memory 130, e.g., a flash memory. These cached data are read from the flash memory 130 via a second data line 133 into the microcontroller 115 with empirically specifiable periodicity in order to divide this data into smaller digital data packets, similar to the data packets generated with the Internet protocol (TCP/IP). These relatively small data packets are then forwarded via a third data line 123 to an LTE module 125 externally communicating wirelessly (LTE="Long Term Evolution" mobile standard), which transmits the data packets wirelessly or radio-technically to the external computer 110 (in the present case, a cloud platform). LTE technology enables the transmission of such digital data packets. Therefore, the transfer of the pre-processed data to the cloud platform 110 is preferably periodically or cyclically in the form of such small data packets.

It should be noted that instead of the abovementioned LTE module 125, a UMTS/GSM or a future available 5G module can also be provided.

In the exemplary embodiment, the radio-technical transmission of the data packets takes place by means of a time management, in which the LTE or GPS module 125 provides a current UTC time, which is stored in the microcontroller 115 during the initiation of the sensor apparatus and is regularly adjusted or refreshed ("updated"). The exact time value or time stamp present at the beginning of a data packet is transmitted as a header in the data packet to the external computer. Only the timestamp of the starting point of a data packet is sent in order to keep the amount of data to be transferred as low as possible. This time stamp and the set sampling rate are later used in data processing in the external computer to establish a time reference of the respective sensor data.

The protocol for data transmission in the exemplary embodiment is the known "MQTT" protocol (MQTT="Message Queue Telemetry Transport", an open message protocol for machine/machine communication (M2M)). Once the data have arrived in cloud platform 110, the data analysis is performed using an appropriate analysis algorithm.

An initial configuration of the sensor system can be done via radio (OTA="Over The Air"), via MQTT or locally via a USB interface 135 already integrated in the present exemplary embodiment via a fourth data line 137. Variable parameters such as the sampling rate, the threshold values, or the length of the MQTT data stacks allow the apparatus to be easily scalable and usable under various or different environmental states.

The additionally marked service routine 140 is described in detail below using FIG. 2.

The sensor apparatus is embedded in the present exemplary embodiment in a housing construction, which can be easily and safely attached to different vehicle types of different car manufacturers or retrofitted if necessary. The sensor apparatus can be operated independently of the vehicle or the vehicle electronics and is supplied with electrical voltage if need be via the vehicle's on-board electronics.

Possible installation locations for the sensor apparatus include chassis components, e.g., shock-absorber struts or wheel carriers, structural body parts arranged in the engine compartment of a vehicle or surrounding structures of a suspension strut bearing, or installation locations near a vehicle battery, an OBD2 interface, in or at a central tunnel or at the vehicle structure in a spare wheel recess. The sensor apparatus is supplied with power either via the connection to the vehicle battery (via ring cable lugs at battery poles), or via the OBD2 interface or an integrated battery pack. It is also possible to install the sensor apparatus in a control unit of a (semi-)active suspension system, steering system or steering actuator (steering gear), a wheel or axle carrier or a braking system.

Figure 2:
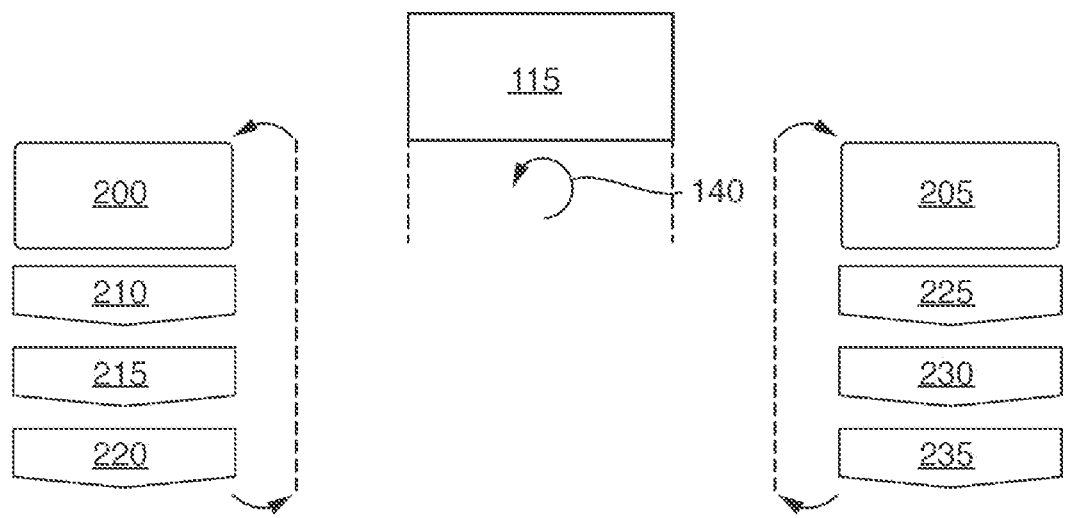
FIG. 2 is a schematic view of a microcontroller of a sensor apparatus, running process steps in accordance with an exemplary embodiment.

In the microcontroller 115, the two processes shown in FIG. 2 are implemented, in particular, for executing the specified service routine 140. On the one hand, the wakeup/sleep routine 200 shown on the left side of FIG. 2 as well as the aforementioned pre-processing process of the initially still raw sensor data 205. To operate the wakeup/sleep routine 200, raw data from the acceleration sensor 120 are continuously read out in each driving state of the vehicle. By means of a pre-processing routine 205, the raw data thus captured are divided into empirically specifiable time windows Δt and, within each of these time windows, a statistical evaluation is carried out by the pre-processing routine 205, on the basis of which an event detection 215, 230 takes place. Based on event detection, a decision logic 220, 235 detects whether there is a relevant event that shifts the wakeup/sleep routine from a sleep mode to an active mode.

A more detailed exemplary embodiment for the execution of the wakeup/sleep routine is given on the basis of FIG. 3 described below.

The wakeup/sleep routine is based on the following basic process conditions:

Sleep mode is activated whenever no event has been detected for an empirically specifiable time period $\Delta t_{idle}$. An empirically specifiable threshold value can be used, wherein an event is detected only when it is exceeded.

During sleep mode, only the sensor element detecting the at least one mechanical variable of the sensor module 120, e.g., an acceleration sensor, is active.

The acceleration sensor continuously supplies the microcontroller with measurement data.

As soon as an event is detected within the specified time window Δt, sleep mode is deactivated, and further process routines are started ("active mode").

Figure 3A:
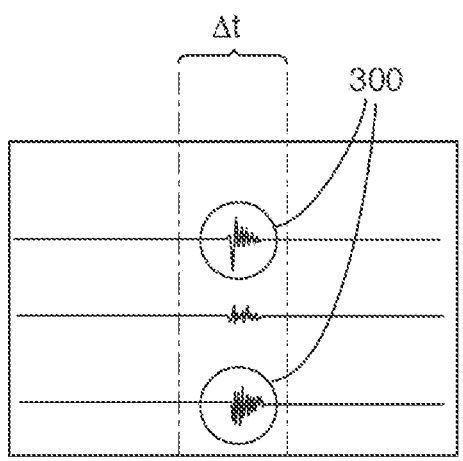
FIG. 3a is a schematic view of an exemplary embodiment of a wakeup/sleep process implemented in the microcontroller in accordance with FIG. 2.
Figure 3B:
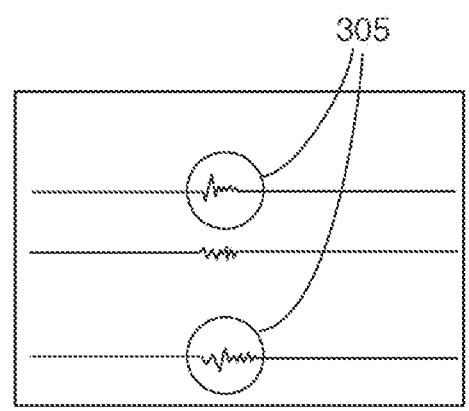
FIG. 3b is a schematic view of an exemplary embodiment of a wakeup/sleep process implemented in the microcontroller in accordance with FIG. 2.

FIGS. 3a and 3b show two different examples of captured raw data from the acceleration sensor. In the raw data shown in FIG. 3a, a specified threshold value is exceeded due to a sufficiently high signal strength or signal amplitude of the acceleration data for a short time 300 and thus, within the time window Δt bounded by a dashed line, a possibly relevant event is detected. This deactivates the first sleep mode of the wakeup/sleep routine. In the case of the raw data of the acceleration sensor shown in FIG. 3b, however, the time window Δt does not exceed 305 the specified threshold value in such a way that the sleep mode is maintained.

During sleep mode, acceleration data measured by the sensor module 120 cannot be cached directly in the flash memory 130 of the apparatus 100, but initially in a smaller buffer memory (not shown). If an acceleration or an acceleration pattern, for example, due to impact on the vehicle, occurs which is greater than the wakeup threshold value, the data already present in the buffer memory can be used to restore the previous time interval, namely the time before or during an initial critical event (e.g., an impact of another vehicle or obstacle). This makes it possible to ensure that information about a critical event necessary for data analysis and correct classification is not lost even in the sleep mode of the sensor module.

To avoid unnecessary performance loss and redundant data, recorded measurements are stored and transmitted to the cloud 110 only when an event that deactivates sleep mode is detected. The sensor data are preferably transmitted to the cloud 110 only if the sensor module is fully active and the vehicle is in active operation ("active mode"). Therefore, a threshold value that is also empirically specifiable can be formed to either wake up the sensor apparatus or the microcontroller 115 accordingly or to put it into sleep mode. For moving into sleep mode, an empirically specifiable temporal threshold value can be formed, which puts the sensor module into sleep mode for events not detected within a defined time interval.

Figure 4A:
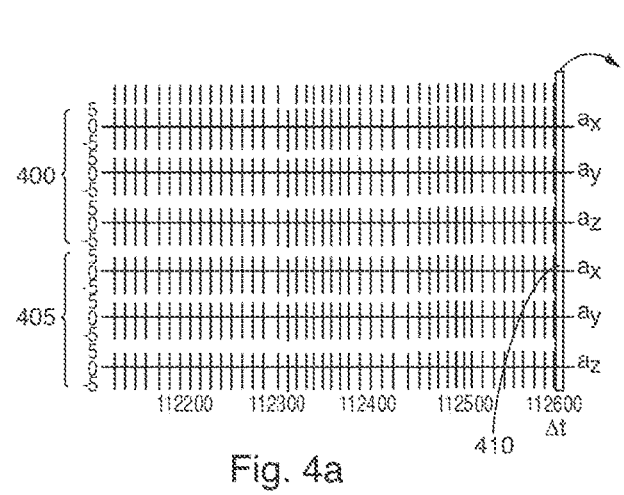
FIG. 4a is a schematic view of an exemplary embodiment of a data pre-processing process implemented in the microcontroller in accordance with FIG. 2.
Figure 4B:
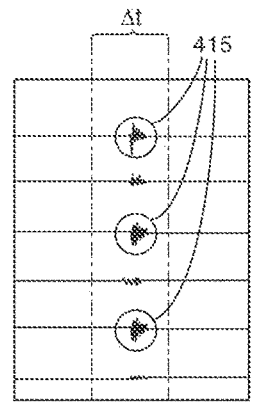
FIG. 4b is a schematic view of an exemplary embodiment of a data pre-processing process implemented in the microcontroller in accordance with FIG. 2.
Figure 4C:
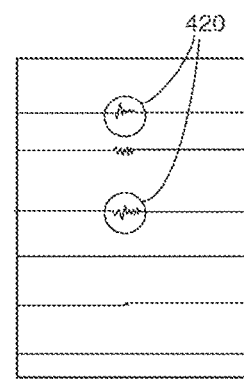
FIG. 4c is a schematic view of an exemplary embodiment of a data pre-processing process implemented in the microcontroller in accordance with FIG. 2.

FIGS. 4a-4c show the pre-processing of raw data from an acceleration sensor and a gyroscope sensor in greater detail. Thus, in FIG. 4a, in the top three lines 400, the acceleration data $a_x$, $a_y$ and $a_z$ continuously supplied in the three spatial directions are shown and, in the bottom three lines 405, the gyro or position data $g_x$, $g_y$ and $g_z$ continuously supplied in the three spatial directions are shown over the measuring time t specified in the time format "hh:mm:ss". In the example shown, about ten events (Events) per minute were detected and result in the discrete time arrangement of the data shown as a whole in FIG. 4a.

The pre-processing process forms defined time windows Δt on the signal curves, which overlap in time, wherein in the example the time window Δt 410 is shown enlarged in FIG. 4b. As can be seen in it, the three dashed signal curves 415 of the raw data each have relatively large amplitudes so that an empirically specified threshold value is exceeded at least for a short time. Therefore, the data set contained in this time window Δt 410 and formed from the six measurement variables $a_x$, $a_y$ and $a_z$ as well as $g_x$, $g_y$ and $g_z$ is completely stored and cached in the preferably non-volatile data memory 130 comprising the respective time stamp shown in FIG. 1, e.g., a flash memory.

The capture or detection of relevant time windows, i.e., time windows with a signal curve contained therein, which exceeds the empirically specified threshold value, must be distinguished, in principle, from the detection of a complete event. Such a time window can now randomly contain a complete event (Event), as is shown in FIG. 4b. Typically, such complete events, such as impact events for example, extend over a plurality of time intervals Δt. To extract and characterize a complete event from a plurality of time windows, further analysis steps are required.

In contrast, the amplitudes of the signal curves 420 shown in FIG. 4c and contained in another time window Δt of the measurement data shown in FIG. 4a as a whole are not sufficient to exceed the said threshold value. In this case, the information "No event" is stored in the flash memory 130 within the time window Δt, together with the relevant timestamp.

It must be noted that the pre-processing routine described only takes place in the "active mode" described in FIG. 3. Accordingly, no data pre-processing takes place in the described "sleep mode".

Figure 5:
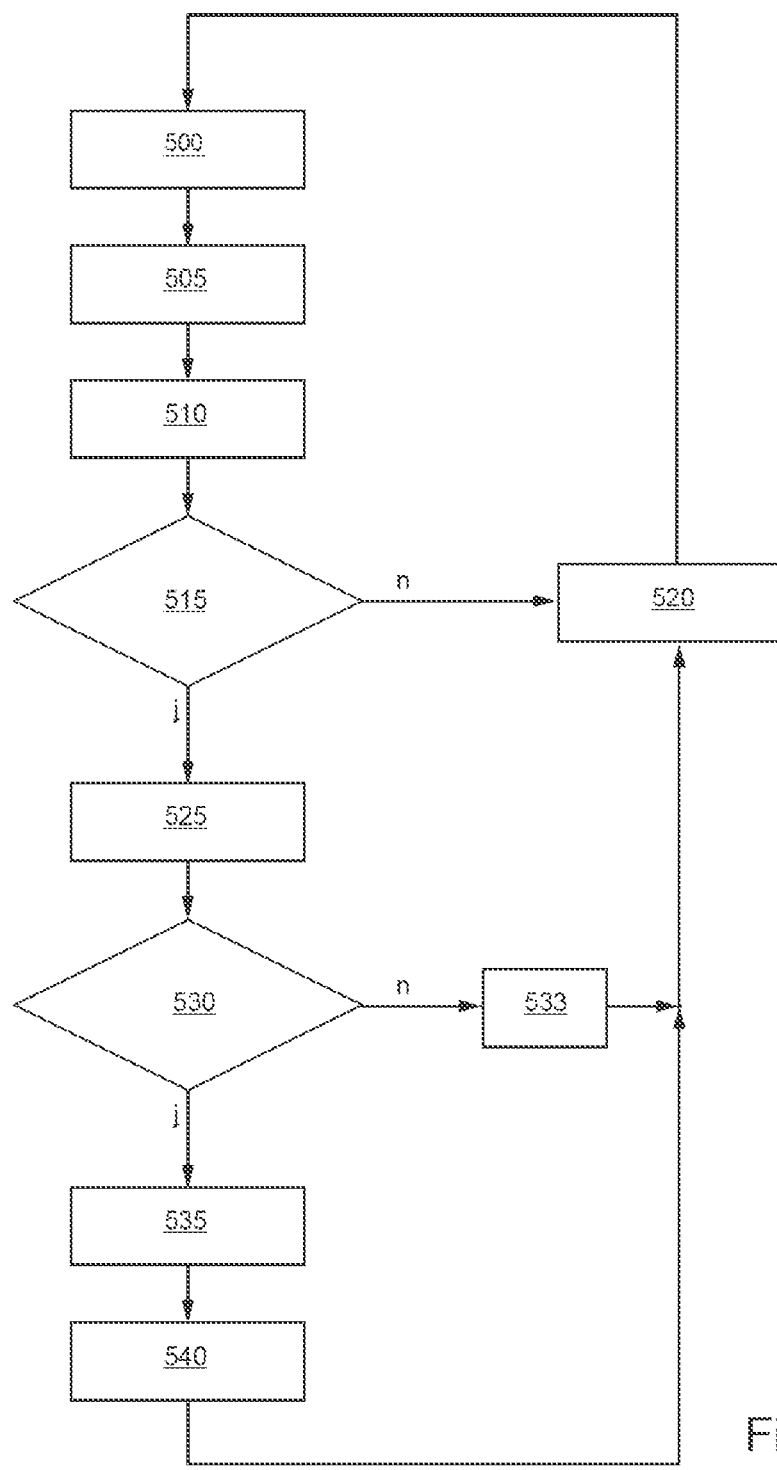
FIG. 5 is a flowchart with process steps for changes of a sensor signal to be captured for a wakeup/sleep process shown in FIG. 3 in accordance with an exemplary embodiment.

In the routine shown in FIG. 5, for example, the raw data provided by an acceleration sensor are read out 500 and cached 505 continuously or on a regular basis. At step 510, a described pre-processing of the raw data takes place, wherein at the following step 515, it is checked whether the raw data have exceeded the specified threshold value within the given time window Δt 410 and thus, a possible event is detected. However, if step 515 does not exceed the threshold value, i.e., no event is detected, then sleep mode is activated or resumed at step 520, and the start of the routine is returned to step 500.

If a possible event is detected at step 515, then at the following step 525, the sleep mode is deactivated and then a check 530 is made on whether there is a relevant event at all. It must be noted that alternatively it can be detected at step 515 whether a relevant event is also present. If this is the case, then, at the following step 535, the cached 505 raw data of the affected time window Δt 410 are called up, written into the internal data memory (flash memory) and transmitted 540 to the external computer from the presence of a specifiable number of stored data packets to the external computer. After that, at step 520, the sleep mode is reactivated and jumped back to the beginning of the routine to step 500.

It should be noted that even longer time ranges than the present time range Δt 410, in which changes have been detected, can be called up. Preferably, all time intervals Δt that have exceeded the threshold value are continuously called up. From these time windows, the overall event can be extracted and characterized or classified in the case of a subsequent incoming data analysis or data evaluation to be carried out in the external computer, e.g., in the cloud 110.

However, if no relevant event is detected at step 530, then at step 533, the specified "null data" is generated; these null data are stored in the internal data memory and then transmitted to the external computer.

The entire routine shown in FIG. 5 thereby represents a continuous, closed process, which ensures that the raw data supplied at least by the acceleration sensor are recorded at each operating phase of the vehicle, i.e., in particular also in a resting phase of the vehicle, and transmitted to the external computer. This makes it possible to make the vehicle history affected here fully available for evaluation on the external computer.

What is claimed is:

1. A vehicle-mounted sensor system for determining a state of at least one mechanical vehicle component and/or a body structure of the vehicle, comprising:
   at least one sensor for continuously capturing sensor data corresponding to a mechanical variable of the mechanical vehicle component in any operating state of the vehicle, a computing unit for performing a reduction of a data volume of the sensor data to be transmitted to an external computer, and a data memory for caching the sensor data;
   wherein at least one sensor provides the sensor data to be transmitted to the computing unit at a specifiable sampling rate;
   wherein the reduction is performed by:
     checking an existence of an event relevant to determining a state of the mechanical vehicle component within a portion of the sensor data that is related to a relevant time window; and
     when a threshold value is exceeded and the event is detected: transmitting the portion to the external computer, and when the event is not detected within the relevant time window, transmitting to the external computer null data as a short piece of information together with a timestamp corresponding to the relevant time window;
   wherein the null data having a reduced data size compared to the captured sensor data and is generated for the relevant time window.

2. The sensor apparatus of claim 1 wherein the at least one sensor has a three-axis acceleration sensor and/or a three-axis angular or gyroscope sensor.

3. The sensor apparatus of claim 2 wherein the at least one sensor has an acoustic sensor and/or a vibration sensor and/or a temperature sensor.

4. The sensor apparatus of claim 1 further comprising a receiver configured to provide a geo-position determination, for assigning position data of the vehicle to the captured sensor data.

5. The sensor apparatus of claim 1 wherein the sensor apparatus is electrically and/or communicationally independent of a vehicle electronics system.

6. The sensor apparatus of claim 1 comprising a sensor module, which is configured to continuously provide sensor data with a specifiable sampling rate, a microcontroller for reducing the volume of data of the sensor data to be transmitted to the external computer, a data memory for caching the reduced sensor data, wherein the microcontroller divides the cached sensor data into digital data packets, which are cyclically transmittable by radio technology to the external computer.

7. The sensor apparatus of claim 1 wherein the reduction is further performed by pre-processing the captured sensor data to filter out irrelevant or redundant data components.

8. The sensor apparatus of claim 1 wherein the reduction is further performed by dividing the reduced sensor data into cyclically transmittable digital data packets.

9. A method for determining the state of at a mechanical vehicle component and/or a body structure of a vehicle, wherein the vehicle has a at least one sensor, a computing unit, and a data memory, the method comprising:
  using the at least one sensor for continuously capturing the sensor data corresponding to a mechanical variable of the mechanical vehicle component in any operating state of the vehicle and caching the sensor data in the data memory, wherein at least one sensor provides the sensor data to the computing unit at a specifiable sampling rate;
  checking an existence of an event relevant to determining a state of the mechanical vehicle component within a portion of the sensor data that is related to a relevant time window; and
  when a threshold value is exceeded and the event is detected: transmitting the portion to an external computer, and when the event is not detected within the relevant time window, transmitting to the external computer null data as a short piece of information together with a timestamp corresponding to the relevant time window;
  wherein the null data having a reduced data size compared to the captured sensor data and is generated for the relevant time window.

10. The method of claim 9 further comprising:
  when the specified threshold value is not exceeded, a sleep mode is activated, and
  when the specified threshold value is exceeded, a possibly activated sleep mode is deactivated.

11. The method of claim 10 wherein sensor data read out during an active sleep mode are initially cached in a buffer memory and the sensor data stored in the buffer memory are used when the specified threshold value is not exceeded to restore a previous time interval with respect to a relevant event.

12. A non-transitory machine-readable data carrier on which a computer program is stored, the computer program comprising program code to be executed by one or more processors when retrieved from a non-transitory computer-readable storage medium, the program code comprising instructions configurable to carry out a method for determining the state of at a mechanical vehicle component and/or a body structure of a vehicle, wherein the vehicle has a at least one sensor, a computing unit, and a data memory, the method comprising:
  using the at least one sensor for continuously capturing the sensor data corresponding to a mechanical variable of the mechanical vehicle component in any operating state of the vehicle and caching the sensor data in the data memory, wherein at least one sensor provides the sensor data to the computing unit at a specifiable sampling rate;
  checking an existence of an event relevant to determining a state of the mechanical vehicle component within a portion of the sensor data that is related to a relevant time window; and
  when a threshold value is exceeded and the event is detected: transmitting the portion to an external computer, and when the event is not detected within the relevant time window, transmitting to the external computer null data as a short piece of information together with a timestamp corresponding to the relevant time window;
  wherein the null data having a reduced data size compared to the captured sensor data and is generated for the relevant time window.

* * * * *